United States Patent

Rockwell, Jr.

[11] Patent Number: 6,001,442
[45] Date of Patent: Dec. 14, 1999

[54] ULTRASONICALLY SPLICED ROLL TOWEL

[75] Inventor: James Nelson Rockwell, Jr., LaGrange, Ga.

[73] Assignee: Milliken & Company

[21] Appl. No.: 08/745,350

[22] Filed: Nov. 8, 1996

[51] Int. Cl.$^6$ .................................................... B32B 3/00
[52] U.S. Cl. .............................. 428/57; 428/53; 428/427; 156/73.1
[58] Field of Search .............................. 428/53, 57, 427; 156/73.1

[56] References Cited

U.S. PATENT DOCUMENTS

| | | | |
|---|---|---|---|
| 3,222,239 | 12/1965 | Deans | 156/380 |
| 3,852,144 | 12/1974 | Parry | 156/510 |
| 3,890,892 | 6/1975 | Loose et al. | 101/32 |
| 4,410,575 | 10/1983 | Obayashi et al. | 428/57 |
| 4,496,407 | 1/1985 | Lowery, Sr. et al. | 156/73.3 |
| 4,532,166 | 7/1985 | Thomsen et al. | 428/57 |
| 4,670,073 | 6/1987 | Langley | 156/73.1 |
| 4,676,559 | 6/1987 | Hood et al. | 312/34.11 |
| 4,683,593 | 8/1987 | Langley | 2/82 |
| 4,693,771 | 9/1987 | Payet et al. | 428/192 |
| 4,888,229 | 12/1989 | Paley et al. | 428/192 |
| 4,938,817 | 7/1990 | Langley | 156/73.1 |
| 4,939,017 | 7/1990 | Foxman | 156/73.3 |
| 5,085,914 | 2/1992 | Perdelwitz, Jr. et al. | 428/137 |
| 5,169,697 | 12/1992 | Langley et al. | 428/57 |
| 5,229,181 | 7/1993 | Daiber et al. | |
| 5,232,529 | 8/1993 | Miyake | 156/73.4 |
| 5,356,682 | 10/1994 | Stewart et al. | 428/57 |
| 5,464,488 | 11/1995 | Servin | 156/73.4 |
| 5,682,618 | 11/1997 | Johnson et al. | 2/275 |
| 5,786,058 | 7/1998 | Megchelsen et al. | 428/57 |
| 5,919,539 | 7/1999 | Bisbis et al. | 428/57 |

FOREIGN PATENT DOCUMENTS

| | | |
|---|---|---|
| 43044 | 1/1982 | European Pat. Off. . |
| 0 170 629 | 4/1985 | European Pat. Off. . |
| 0 165 211 | 5/1985 | European Pat. Off. . |
| 0 340 334 | 9/1988 | European Pat. Off. . |
| 2.115.456 | 11/1971 | France . |
| 1 294 175 | 2/1965 | Germany . |
| 25 55 385 | 12/1975 | Germany . |
| 1 249 857 | 12/1967 | United Kingdom . |

*Primary Examiner*—Blaine Copenheaver
*Assistant Examiner*—Arti Singh
*Attorney, Agent, or Firm*—Terry T. Moyer; Earle R. Marden

[57] ABSTRACT

A roll towel for use in the drying of hands in the lavatory setting is provided. The roll towel includes at least two segments of textile material which include at least 60 percent polyester fiber. The two segments of textile material are spliced together by an ultrasonically formed seam. The seam is made up of a series of bonding points offset from one another by nonbonded segments.

4 Claims, 2 Drawing Sheets

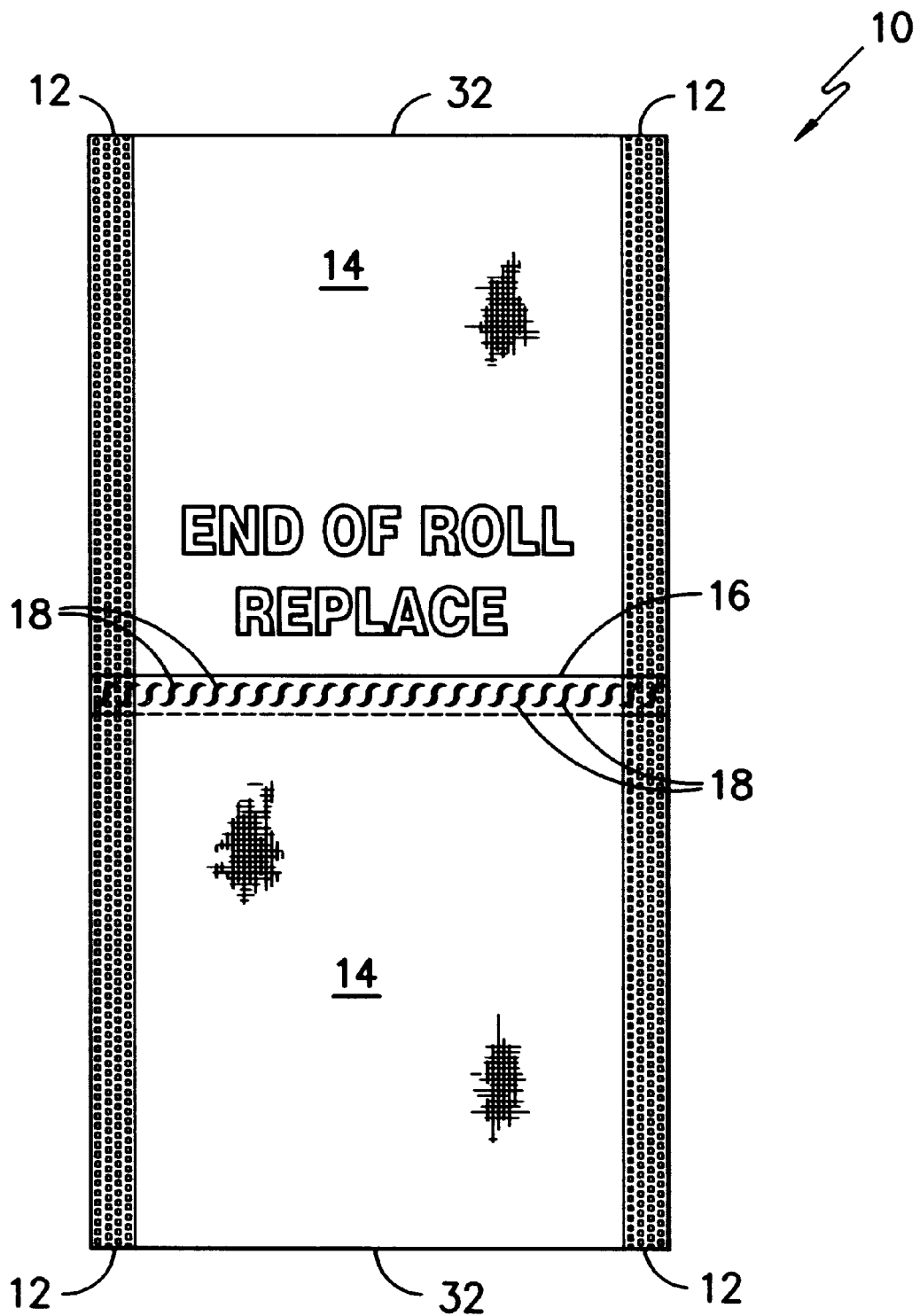
FIG. -1-

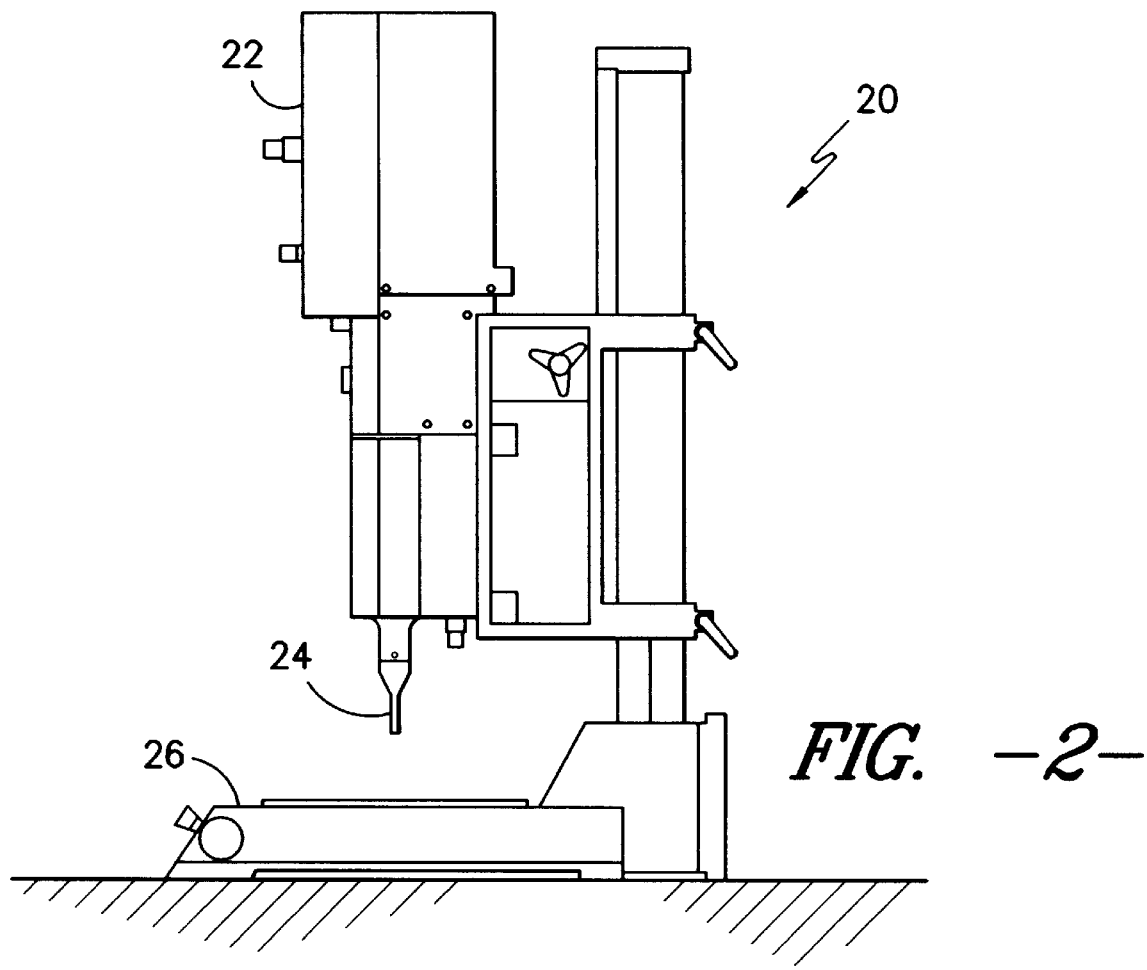
FIG. -2-
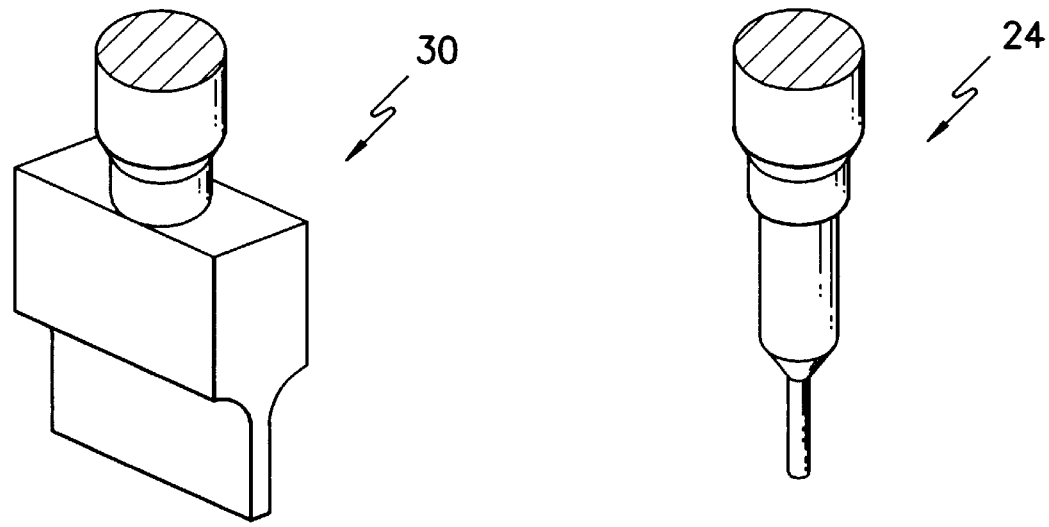
FIG. -3-　　　FIG. -4-

ULTRASONICALLY SPLICED ROLL TOWEL

FIELD OF THE INVENTION

This invention relates generally to hand wiping roll towels and more particularly to polyester roll towels including an ultrasonically applied splice between segments of such roll towels.

BACKGROUND OF THE INVENTION

Hand wiping roll towels for use in public lavatories are well known. Such roll towels typically are mounted in a wall hanging cabinet having supply and take-up rolls such that the user can pull down a clean, unused segment of the towel from the supply roll with the previously used segment of the towel being conveyed back to the take-up roll. In the past, such towels have typically been formed primarily of cotton so as to provide the user with the absorbency and texture benefits of such a product.

Roll towels are typically formed from woven fabric structures as are well known to those of skill in the art. The fabric which is formed is thereafter typically sealed at the edges by sewing and then shipped in roll form to rental laundries. In practice, these laundries install clean towels and reclaim soiled towels for cleaning and reuse. The length of such fabric segments is generally in the range of about 21 meters.

As will be appreciated, at times it is necessary to splice segments of material together to form a complete length for use in a roll towel application. More significantly, once the roll towel is in actual use, it may be necessary to cut out damaged or stained portions of the towels and splice the remainder back together. This is particularly true since the towels undergo multiple uses in between which they are washed and inspected. In prior practice, such splicing was generally accomplished by means of standard sewn seams traversing the width of the fabric. While such sewn seams are extremely strong, they are generally considered to be aesthetically unpleasing since the towel tends to take on a dog-bone profile in the vicinity of the seam. This is particularly true once a number of sections of the roll towel material have been cut and spliced back together.

In light of the above, it would be advantageous to have a roll towel wherein a strong, spliced seam may be formed by means other than a standard sewing procedure. The present invention provides such a roll towel and method for forming a splice therein wherein the spliced seam is formed by a patterned ultrasonic bond disposed across the width of the roll towel.

BRIEF DESCRIPTION OF THE DRAWINGS

FIG. 1 is a plan view of a roll towel according to the present invention.

FIG. 2 is a perspective view of an ultrasonic seam-forming arrangement for use in accordance with the process of the present invention.

FIG. 3 is an ultrasonic horn for use in forming a seam across a roll towel in accordance with the process of present invention.

FIG. 4 is an ultrasonic horn for use in forming a seam across a roll towel in accordance with the process of the present invention.

While the invention has been illustrated and will be described in connection with certain preferred embodiments and procedures, it is, of course, to be appreciated that there is no intention to limit the invention to such particularly illustrated and described embodiments and procedures. On the contrary, it is intended by the inventor to include all alternatives, modifications, and equivalents as may be included within the true spirit and scope of the invention.

DESCRIPTION OF THE PREFERRED EMBODIMENTS

Turning now to the figures, in FIG. 1 there is shown a roll towel 10 according to the present invention. In the illustrated and potentially preferred embodiment, the roll towel 10 includes an ultrasonically bonded, boundary edge 12 disposed on either side of an intermediate textile surface 14. In the preferred embodiment, the roll towel 10 is formed of polyester or cotton/polyester fiber which preferably includes at least 60 percent polyester so as to promote a strong, ultrasonic bond between the fibers. In the most preferred practice, 100 percent polyester is utilized.

As illustrated, the ultrasonically bonded, boundary edges 12 preferably have a discontinuous brick-like pattern formed therein by a patterned backing wheel operating adjacent to an ultrasonic horn with fabric disposed therebetween. Such a discontinuous brick-like pattern is believed to provide exceptional flexibility which in turn promotes the operability of the product on the supply and take-up rolls of a cabinet structure in a public lavatory.

As illustrated, the roll towel 10 may also include one or more ultrasonically formed splices 16 disposed across the width of the roll towel structure 10 thereby joining segments of the roll towel 10 together forming a longer overall structure. The ultrasonically formed splice 16 preferably includes a discontinuous (i.e. nonsolid) seam having a pattern of bonding points 18 offset from one another by segments within the boundaries of the seam which are not ultrasonically bonded. The bonding points 18 preferably have both longitudinal and latitudinal stress carrying components. In practice, clear tape may be used to aid in alignment of such splices.

By way of example only, and not limitation, in the illustrated, and potentially preferred embodiment, the bonding points 18 are of an elongated "S" shaped configuration. It is believed that such a configuration carries latitudinal loads along the top and bottom portions of the "S" while carrying longitudinal stresses along the elongated middle portion.

The ultrasonically formed splices 16 are preferably put in place by an ultrasonic bonding apparatus 20 as illustrated in FIG. 2. One potentially preferred ultrasonic bonding apparatus is the FS90 ultrasonic welder with a 910 BC series power supply available from Branson Ultrasonics Corporation having a place of business in Danbury, Conn., USA. As illustrated, the ultrasonic bonding apparatus preferably includes an actuation unit 22, an ultrasonic horn 24, and a bonding stand 26 for holding the roll towel 10 during the actual bonding operation. The bonding stand 26 also preferably includes a patterned wheel (not shown) which has a raised pattern of the bonding points 18 and which travels by rotation across the width of the roll towel 10 in opposed relation to the ultrasonic horn 24 with the fabric of the roll towel therebetween so as to form the splice 16.

In the potentially preferred practice of the present invention, the ultrasonic horn 24 is a one inch button horn (FIG. 4) which operates in conjunction with a 2.5 inch diameter pattern wheel available from Branson Ultrasonics. The actuation unit 22 has a power output of 1000 watts and generates an operating frequency of 20 KHz. In the potentially preferred practice, the splice 16 is formed at a rate of approximately 3 inches per minute. The splice which is formed preferably has a width of at least ⅜ inches so as to enhance the strength of the overall structure. It is believed that through proper formation of the splice 16, that strengths approaching those available with traditional sewn seams may be available. By way of illustration only and not limitation, the comparative strengths as measured by an Instron Tester using a three inch seam segment are illustrated in Table I.

TABLE I

| Seam Type | Ultrasonic Solid Seam | Ultrasonic Brick Seam | Ultrasonic "S" Seam | Sewn Seam | No Seam |
|---|---|---|---|---|---|
| Breaking Strength (Pounds Force) | 34 | 57 | 75 | 92 | 390 |

It is contemplated that a splice may also be formed by means of an elongated ultrasonic horn 30 (FIG. 3). In the use of such a horn, it is contemplated that a plunging type action may be utilized to bring the horn into adjacent relation to a permanently fixed pattern bar, thereby eliminating the need to move the horn and pattern wheel across the surface to be bonded and thus potentially speeding up the overall splicing process.

It is further contemplated that ultrasonic processes may also be utilized to form patterns on the intermediate woven surface 14 of the roll towel 10 using either the button-type horn 24 and patterned wheel or the elongated horn 30 and patterned backing bar. By way of example only, and not limitation, an icon or series of icons comprising a message may be physically impressed upon the roll towel 10 so as to alert the users that replacement of the roll is required. Such a message would preferably be placed at the end of the roll so as to become visible when the feed roll is dissipated. In this way, the possibility of a soiled towel remaining in a position of use is substantially reduced. It is further contemplated that an ultrasonic edge bond could be established across the terminal ends 32 of the roll towel 10 so as to promote the seaming of the roll towels one to the other for conveyance through very large industrial laundry ranges without causing fraying when the stitches are removed once the laundering process is complete.

As will be appreciated, the present invention provides a roll towel structure having a number of benefits and advantages. While specific embodiments of the invention have been shown and described, it is to be understood that the invention is in no way limited thereto, since modifications may be made and other embodiments of the principals of this invention will no doubt occur to those of skill in the art. Therefore, it is contemplated by the appended claims to cover any such modifications or other embodiments as incorporate the features of the present invention within the true spirit and scope thereof.

What is claimed is:

1. A hand drying roll towel for use in a lavatory setting, the roll towel comprising at least two segments of textile material comprising at least 60 percent polyester spliced together by means of an ultrasonically formed seam wherein said ultrasonically formed seam comprises a series of bonding points offset one from the other by segments which are not ultrasonically bonded, wherein said bonding points have an elongated "S" shaped configuration.

2. A hand drying roll towel as in claim 1, wherein said textile material consists essentially of polyester.

3. A hand drying roll towel as in claim 1, further comprising at least one longitudinally extending ultrasonically bonded boundary edge.

4. A hand drying roll towel as in claim 1, further comprising one or more ultrasonically embossed message-conveying icons disposed within said textile material.

* * * * *